2,894,827

URANIUM SEPARATION PROCESS

Earl K. Hyde, Berkeley, Calif., and Leonard I. Katzin, Chicago, and Michael J. Wolf, Peoria, Ill., assignors to the United States of America as represented by the United States Atomic Energy Commission No Drawing. Application October 10, 1949
Serial No. 120,604

13 Claims. (Cl. 23—312)

This invention relates to the separation of uranium from a mixture of uranium and thorium by solvent extraction from an aqueous solution. The present invention also relates to the extraction of uranium from an organic solvent solution.

Monazite sand contains uranium and thorium values in minor concentrations. Analyses of samples of domestic, Indian and Brazilian monazite sands showed the uranium content, as $U_3O_8$, varied between 0.23 and 0.47% while the thorium content, as $ThO_2$, varied between 3.1 and 6.6%. Of course, the rare earth and phosphorus values were the major constituents of these monazite sands. The rare earth content, as oxide, varied between 40.7 and 58.4% while the phosphorus values, as $P_2O_5$, varied between 19.3 and 28.4%. By various processes, not forming a part of the present invention, it is possible to separate a mixture of uranium and thorium from the other constituents of monazite sand. The mixture thus obtained is predominantly thorium and the problem arises of developing an efficient method for separating the minor constituent, namely, uranium, from said mixture.

With the development of the uranium-graphite pile for production of plutonium, fission products, and energy, it was found that an increased utilization of neutrons could be accomplished by the use of a blanket of thorium or a thorium-containing material around the pile. By the use of this blanket the thorium isotope, $Th^{232}$, absorbed neutrons to form $Th^{233}$, which decayed by beta-emission to $Pa^{233}$. This protactinium isotope decayed by beta-emission to $U^{233}$. The half-lives of $Th^{233}$ and $Pa^{233}$ are twenty-three minutes and twenty-seven and four-tenths days, respectively. It is desirable to remove $U^{233}$ from the thorium blanket before the concentration of $U^{233}$ becomes very high and thorium can be purified for re-use in the blanket. This purification of thorium could be accomplished by removing the blanket from the pile after a certain period of irradiation and storing the blanket for a sufficient period of time to allow substantially all of the protactinium present to decay to $U^{233}$. In such a case, it would be necessary only to separate $U^{233}$ from thorium. However, this would necessitate the storage of the material for a considerable length of time. By the use of a storage period in a purification process, the amount of time that thorium could be used as a blanket would be much less than in the case of a purification process requiring no storage period. To eliminate the storage period from the purification process, it is necessary to separate protactinium as well as uranium from thorium. Thus, it is desirable either to first remove $U^{233}$ and then separate $Pa^{233}$ from thorium or to separate $U^{233}$ and $Pa^{233}$ simultaneously from thorium. The amounts of $Pa^{233}$ and $U^{233}$ produced by the neutron-irradiation of thorium are quite small, rarely being above 1% by weight of thorium and usually being substantially below this concentration. Thus, it is necessary to recover $Pa^{233}$ and $U^{233}$ from thorium masses having $U^{233}$ and $Pa^{233}$ concentrations below one part per thousand parts and even one part per million parts of thorium.

Protactinium occurs in nature as the decay product of uranium Y, a short-lived, beta-emitting thorium isotope which in turn is formed from the very long-lived uranium isotope $U^{235}$ found to the extent of 0.7% in natural uranium. Protactinium, therefore, occurs naturally only in uranium ores, and to the extent of about 0.25 part protactinium per million parts of uranium, this value being fixed by the relative decay rates of $U^{235}$ and $Pa^{231}$. For comparison, radium is present at 0.35 part per million of uranium. The formidable task of isolating protactinium occurring in such a minute concentration is somewhat lightened by the availability of waste fractions from the commercial processing of uranium ores which contain slightly greater concentrations of protactinium and which are more amenable to chemical treatment than the raw ores. During the processing of such uranium ores the major portion of the uranium and some of the other constituents are dissolved in nitric acid. By the addition of sodium carbonate some of the dissolved impurities, which include protactinium, polonium, ionium ($Th^{230}$), and radium, are precipitated. This sodium carbonate precipitate contains some uranium and is available for the recovery of uranium and protactinium by separation from thorium and the other constituents. In some instances, it may be desirable to first separate the uranium from the mixture and then remove protactinium.

An object of this invention is to separate uranium from a mixture of uranium and thorium.

A second object of the present invention is to separate uranium from a mixture of uranium, thorium and protactinium.

A third object of the invention is to separate uranium and protactinium from a mixture of uranium, thorium and protactinium.

Another object of this invention is to provide a process for the separation of uranyl nitrate from a solution of uranyl nitrate in an organic solvent of the present invention.

Other objects of the present invention will be apparent from the description which follows.

We have found that uranium can be separated from a mixture of uranium and thorium by forming an aqueous solution containing said mixture, as uranyl and thorium nitrates, and solvent extracting uranyl nitrate from the aqueous solution. The aqueous solution also contains up to 3 N nitric acid and a nitrate salting-out agent. The concentration of nitric acid is preferably about 1 N or less. The solution may contain no free nitric acid, but a pH of 3 or less is preferred for maximum uranium extraction. The nitrate concentration provided by nitric acid, thorium nitrate and nitrate salting-out agent is a maximum of 8 N and is preferably 6 N or less in order to prevent relatively substantial extraction of thorium nitrate. The process comprises forming the foregoing solution, contacting the solution with a substantially water-immiscible, aliphatic, oxygen-containing organic solvent of the group consisting of alcohols, ketones, esters, polyglycol ethers, and mixtures thereof, and separating the resultant aqueous phase and solvent extract phase containing uranyl nitrate.

The nitrate salting-out agent to be used in the present invention is an alkali nitrate, alkaline earth nitrate or other nitrate salts which are nonextractable by the organic solvents of this invention under the conditions of acidity etc. used. Specific examples of suitable nitrate salting-out agents for the present process are as follows:

Ammonium nitrate
Calcium nitrate
Strontium nitrate
Aluminum nitrate
Magnesium nitrate
Lanthanum nitrate
Manganese nitrate
Cupric nitrate
Silver nitrate
Potassium nitrate
Sodium nitrate
Lithium nitrate Ammonium nitrate, calcium nitrate and aluminum nitrate are preferred.

Specific examples of suitable members of the classes of aliphatic oxygen-containing organic solvents to be used in this invention are as follows:

Diethyl ether of ethylene glycol (diethyl "Cellosolve")
Dibutyl ether of ethylene glycol (dibutyl "Cellosolve")
Dibutyl ether of diethylene glycol (dibutyl "Carbitol")
2(2-ethyl butoxy)-ethanol (2-ethyl-butyl "Cellosolve")
Sec-butyl carbinol
Diethyl carbinol
n-Heptanol
Methyl n-amyl carbinol
Diisopropyl carbinol
Dibutyl ether of tetraethylene glycol
Tert-amyl alcohol
2-methyl-2-pentanol
2-methyl-2-hexanol
2-methyl-2-heptanol
Methyl n-propyl ketone
Methyl isobutyl ketone (also called hexone)
Diisopropyl ketone
Methyl n-amyl ketone
n-Propyl acetate
Isopropyl acetate
Sec-butyl acetate
n-Butyl acetate
Isobutyl acetate
n-Amyl acetate
Methyl propionate
Ethyl propionate
Ethyl butyrate
2-ethylbutyl acetate Hexone, diisopropyl ketone and n-amyl ketone are preferred solvents.

In one embodiment of this invention, uranium is separated from a mixture of uranium and thorium by forming the aqueous solution described above and extracting with the aliphatic organic solvent of this invention.

In a second embodiment of the present invention, uranium is separated from a mixture of uranium, thorium and protactinium forming the aqueous solution as described above, but the nitric acid concentration is limited to a maximum of 0.1 N in order to prevent relatively substantial extraction of protactinium nitrate along with uranyl nitrate.

In a third embodiment of this invention, uranium and protactinium are recovered from a mixture containing uranium, thorium and protactinium by forming an aqueous solution of their nitrates, said aqueous solution also containing a nitrate salting-out agent and between 0.1 and 3 N nitric acid. As in the foregoing embodiments, the aqueous solution is provided with a maximum nitrate concentration of 8 N by the nitric acid, salting-out agent and thorium nitrate, and preferably the concentration is 6 N or below.

In still a further embodiment of the invention, the steps of the preceding embodiments are followed by contacting the organic solvent extract phase with water and separating an organic solvent phase and an aqueous extract phase containing uranyl nitrate. Of course, in the embodiment where protactinium nitrate is extracted by the organic solvent along with uranyl nitrate, protactinium nitrate is in the water extract phase obtained by this embodiment.

In another embodiment of this invention, uranyl nitrate is extracted from a solution of uranyl nitrate in the aliphatic, oxygen-containing organic solvent of this invention by means of water.

In all of these embodiments, the contact time can be varied widely but it was found that with adequate mixing several minutes were sufficient. The temperature of the solutions can be varied considerably below the boiling points of the solutions. However, it is preferred to operate at about room temperature. The ratio of aqueous solution to organic solvent in the extraction or re-extraction can be varied widely, for example, between 10:1 and 1:10.

The following examples, taken alone and in combination, are illustrative of the process of the present invention, especially of the various embodiments described above. In the solvent extraction experiments reported below as Examples I to X, inclusive, and including Tables I to X, inclusive, the aqueous solutions were prepared from concentrated stock solutions of thorium nitrate, nitric acid, ammonium nitrate and the various other salting-out agents. The proper amounts of these stock solutions and of distilled water were delivered from burets to a 15-ml. calibrated, glass-stoppered centrifuge cone to make 5 ml. of solution of a desired composition. Then $Pa^{233}$ tracer as nitrate was added for some experiments. Since $Pa^{233}$ has a short half life, the amount of tracer used in the various experiments varied between 10,000 and 300,000 beta counts per minute at 10% counting yield. Tracer $U^{233}$, as uranyl nitrate, in the amount of 5,000 to 10,000 alpha counts per minute at 52% counting yield was also added to the aqueous solutions used in these experiments to determine the percentage of uranium extraction. This $U^{233}$ concentration was between about $3 \times 10^{-4}$ and $6 \times 10^{-4}$ M. In each experiment an equal volume of the particular organic solvent was added, the cone was shaken for five minutes, and the layers were cleanly separated by centrifugation. Aliquots of the solvent layer were analyzed for thorium, protactinium and uranium salts when present in the original aqueous solution.

To determine the percentage of thorium extraction, excess saturated oxalic acid in 1 N hydrochloric acid was added to a 2-ml. aliquot of the solvent layer to precipitate thorium oxalate. The precipitate was separated by filtration and was washed. It was dissolved with slight heating in an excess of standard ceric sulfate and the excess of ceric sulfate was determined by back-titrating with standard ferrous ammonium sulfate to the ferroin end point.

To determine the percentage of uranium extraction, a 0.5-ml. aliquot of the solvent layer was shaken with 0.5-ml. of distilled water in a 5-ml. centrifuge cone. After the separation of aqueous and organic solvent layers, the cone was immersed in a Dry-Ice-acetone bath to freeze the aqueous layer. The organic solvent was poured out of the cone and it was discarded. The frozen aqueous layer was warmed to room temperature to liquefy. The aqueous layer was evaporated on a platinum disc and the amount of $U^{233}$ on the disc was determined by measuring the alpha disintegration rate in a standard pulse ionization chamber. Where the amount of thorium extracted from the initial aqueous solution was more than 2%, it was necessary to remove it from the aqueous extract of the organic solvent aliquot prior to evaporating the aqueous extract on the platinum disc. This was done by adding a few drops of 6 N hydrofluoric acid to precipitate thorium tetrafluoride, evaporating the supernatant solution on a platinum disc and counting $U^{233}$. This separation of thorium reduced the uranium content of the aqueous extract, and a 10% correction was applied to the percentage of uranium extraction.

To determine the percentage of protactinium extraction, 0.25-ml. to 2-ml. aliquots of the solvent layer were evaporated over water to obtain aqueous solutions of protactinium nitrate. These solutions were evaporated on either a platinum plate or a 1-inch diameter watch glass. The dry samples were counted on a standard Geiger-Müller beta counter.

The thorium extraction data were obtained using aqueous solutions having the compositions described, but $U^{233}$ and $Pa^{233}$ tracers were absent. In those extraction experiments the percent thorium extraction was determined and the radioactivity of the solvent extract phase was indicative of the degree of extraction of thorium decay product activities. These radio-activities of the extracts were subtracted from the radio-activities of the solvent extracts in the experiments using $Pa^{233}$ and $U^{233}$ tracer for accurate determination of the actual amount of protactinium and uranium extracted by the organic solvents.

EXAMPLE I

In Table I below are presented extraction data using a number of organic solvents that are illustrative of the solvents of this invention. In all cases, except as indicated, the original aqueous solution contained 1 N nitric acid, 3 N ammonium nitrate and 2 N thorium nitrate. Of course, the uranium and protactinium extraction data were obtained using aqueous solutions also containing the corresponding tracer uranyl or protactinium nitrate.

*Table I*

| Organic solvent | Percent U extd. | Percent Th extd. | Percent Pa extd. |
| --- | --- | --- | --- |
| n-Heptanol | 24 | 0.7 | 74 |
| Methyl isobutyl ketone | 57 | 2 | 21 |
| Diisopropyl ketone | 56 | 0.3 | 49 |
| Methyl n-amyl ketone | 47 | 0.9 | 3 |
| n-Butyl acetate | 39 | 0.1 | 11 |
| n-Amyl acetate | 31 | 0.3 | ¹ 32 |
| Dibutyl "Carbitol" | 59 | 2.7 | |
| 2-Ethylbutyl "Cellosolve" | 59 | 7 | |

¹ From a solution 2 N instead of 3 N ammonium nitrate.

The data of Table I show that the organic solvents of this invention are effective for separating uranium from a mixture of uranium and thorium. The data also show that protactinium is extracted with uranium from a mixture of uranium, thorium and protactinium when the aqueous solution contains 1 N nitric acid and a nitrate salting-out agent.

EXAMPLE II

The data in Table II below present the extraction of protactinium from aqueous solutions containing tracer protactinium nitrate and varying concentrations of nitric acid using diisopropyl ketone as the organic solvent.

*Table II*

| Nitric acid, N: | Percent Pa extd. |
| --- | --- |
| 0 | 0.2 |
| 0.1 | 0.5 |
| 0.5 | 8 |
| 2 | 53 |
| 4 | 72 |
| 5 | 67 |
| 6 | 73 |
| 8 | 75 |

These data show the importance of having at least a minimum amount of nitric acid present for co-extracting protactinium with uranium. Of course, the percent extracted would be increased by the presence of thorium nitrate and the use of a nitrate salting-out agent as will be apparent from the next example.

EXAMPLE III

The percent uranium and thorium extracted by methyl isobutyl ketone from aqueous solutions containing 1 N thorium nitrate, having pH values between 1 and 1.5, and containing varying concentrations of calcium nitrate are presented in Table III.

*Table III*

| Ca nitrate, N | Total nitrate, N | Percent U extd. | Percent Th extd. |
| --- | --- | --- | --- |
| 1 | 2 | 12 | 0 |
| 2 | 3 | 27 | 0 |
| 3 | 4 | 52 | 0.2 |
| 4 | 5 | 69 | 0.8 |
| 5 | 6 | 80 | 1.6 |

EXAMPLE IV

In a set of experiments the methyl isobutyl ketone extraction was from aqueous solutions containing 1 N thorium nitrate, 1 N nitric acid, and a varying concentration of ammonium nitrate. The data are presented below in Table IV.

*Table IV*

| Ammonium nitrate, N | Total nitrate, N | Percent U extd. | Percent Th extd. |
| --- | --- | --- | --- |
| 0 | 2 | 16 | 0.1 |
| 2 | 4 | 42 | 0.5 |
| 4 | 6 | 60 | 1.7 |
| 6 | 8 | 70 | 5.3 |
| 8 | 10 | 82 | 13 |

EXAMPLE V

In another set of extraction experiments diisopropyl ketone was used and the aqueous solutions contained 1 N thorium nitrate, 1 N nitric acid, and varying concentrations of magnesium nitrate. The data are presented below in Table V.

*Table V*

| Mg nitrate, N | Total nitrate, N | Percent Th extd. |
| --- | --- | --- |
| 0.5 | 2.5 | 0.1 |
| 1 | 3 | 0.2 |
| 2 | 4 | 0.8 |
| 3 | 5 | 4.3 |
| 4 | 6 | 8.3 |
| 6 | 8 | 35 |

The data in Examples IV and V show that thorium extraction is appreciable when the total nitrate concentration is above 8 N.

EXAMPLE VI

The experiments in this example are identical with those in Example V except the original aqueous solutions contained varying concentrations of calcium nitrate instead of magnesium nitrate.

*Table VI*

| Ca nitrate, N | Total nitrate, N | Percent U extd. | Percent Th extd. |
| --- | --- | --- | --- |
| 2 | 4 | 48 | 0.1 |
| 3 | 5 | 64 | 0.5 |
| 4 | 6 | 74 | 0.6 |
| 6 | 8 | 71 | 4.3 |

EXAMPLE VII

The uranium and thorium extraction by diisopropyl ketone from aqueous solutions containing 1 N thorium nitrate and varying concentrations of magnesium nitrate and having pH values between 1 and 1.5 were determined; the data are presented below in Table VII.

Table VII

| Mg nitrate, N | Total nitrate, N | Percent U extd. | Percent Th extd. |
|---|---|---|---|
| 3 | 4 | 63 | 0.1 |
| 4 | 5 | 80 | 1 |
| 5 | 6 | 96 | 3.1 |
| 6 | 7 | | 12 |

A comparison of the thorium extraction data of Table VII with those of Table V shows the beneficial effect, namely decreased thorium extraction, by using an aqueous solution having a lower acidity.

EXAMPLE VIII

Table VIII presents extraction data using diisopropyl ketone and aqueous solutions containing 1 N thorium nitrate and varying concentrations of aluminum nitrate, and having pH values between 1 and 1.5.

Table VIII

| Al nitrate, N | Total nitrate, N | Percent U extd. | Percent Th extd. |
|---|---|---|---|
| 2 | 3 | 16 | 0 |
| 3 | 4 | 33 | 0.1 |
| 4 | 5 | 72 | 0.7 |
| 5 | 6 | | 0.9 |
| 6 | 7 | | 5.7 |

EXAMPLE IX

Aqueous solutions containing 3 N thorium nitrate and varying concentrations of nitric acid and ammonium nitrate were extracted with dibutyl "Carbitol." Table IX below presents the data.

Table IX

| Nitric acid, N | Ammonium nitrate, N | Total nitrate, N | Percent U extd. | Percent Th extd. |
|---|---|---|---|---|
| 0.5 | 0 | 3.5 | 28 | 0.1 |
| 0.5 | 3.5 | 7 | 52 | 2 |
| 0.5 | 6.5 | 10 | | 15 |
| 0 | 4 | 7 | 48 | 0.6 |
| 0.5 | 3.5 | 7 | 53 | 2.0 |
| 1.0 | 3 | 7 | 59 | 2.7 |
| 2.0 | 2 | 7 | 58 | 9.1 |

EXAMPLE X

The effect of nitric acid concentration on the extraction by methyl n-amyl ketone was studied using aqueous solutions containing 2 N thorium nitrate with nitric acid and ammonium nitrate concentrations as indicated in Table X.

Table X

| Nitric acid, N | Ammonium nitrate, N | Total nitrate, N | Percent U extd. | Percent Th extd. |
|---|---|---|---|---|
| 0[1] | 4 | 6 | 37 | 0.1 |
| 1 | 3 | 6 | 47 | 0.9 |
| 2 | 2 | 6 | 44 | 1.4 |
| 4 | 0 | 6 | 45 | 3.6 |

[1] Aqueous solutions had Beckmann pH readings between 1 and 1.5.

EXAMPLE XI

A series of feed solutions having the compositions shown in Table XI in addition to containing a tracer concentration of $U^{233}$ as nitrate was prepared. A 5-ml. quantity of each solution was treated as follows: The aqueous solution was shaken with an equal volume of hexone for five minutes in a glass-stoppered mixing cylinder. The resultant hexone phase was analyzed for thorium and uranium in the following manner: A 2-ml. sample was evaporated in contact with 0.5–1 ml. of 1 N nitric acid. The resultant aqueous solution was washed into a 5-ml. centrifuge cone where the thorium was precipitated as thorium oxalate using 1 M oxalic acid. After standing for five minutes the solution was centrifuged. The supernatant was separated and saved for uranium determination. The oxalate precipitate was washed two or three times with 0.1 N hydrochloric acid and the washings were combined with the supernatant solution. The precipitate was dissolved in an excess of standard ceric sulfate solution. After the solution had cleared, the excess ceric ion was determined by back-titration using a standard solution of ferrous sulfate with ferroin as the indicator. The uranium content of the combined supernatant and washings was determined by diluting the combined volume to a particular volume and counting an aliquot of the resulting solution for alpha activity. A run was made in which the aqueous solution contained no $U^{233}$ tracer. The alpha counts of an aliquot of the diluted mixture of supernatant and washings indicated that there was no interference from the alpha-emitting members of the thorium decay series.

Table XI

| Composition Aqueous Feed Solution | | | | Distribution Ratio (Hexone/Aqueous) | |
|---|---|---|---|---|---|
| $Th(NO_3)_4$, M | $NH_4NO_3$, N | $HNO_3$, N | Total nitrate, N | Uranium | Thorium |
| 0.78 | 3 | 0.1 | 6.2 | 2.9 | $15 \times 10^{-3}$ |
| 0.78 | 3 | 0.05 | 6.1 | 2.1 | $13 \times 10^{-3}$ |
| 0.78 | 3 | 0.025 | 6.1 | 2.8 | $7.1 \times 10^{-3}$ |
| 0.78 | 3 | ([1]) | 6.1 | 1.7 | $4.4 \times 10^{-3}$ |
| 0.52 | 4 | 0.05 | 6.1 | 4.0 | $6.5 \times 10^{-3}$ |
| 0.52 | 2.7 | 0.05 | 4.8 | 1.0 | $2.9 \times 10^{-3}$ |
| 0.52 | 2 | 0.05 | 4.1 | 0.9 | $0.6 \times 10^{-3}$ |
| 0.67 | 4 | 0.05 | 6.7 | 4.3 | $14 \times 10^{-3}$ |
| 0.67 | 2.7 | 0.05 | 5.3 | 3.3 | $5.1 \times 10^{-3}$ |
| 0.67 | 2 | 0.05 | 4.7 | 1.6 | $0.8 \times 10^{-3}$ |

[1] pH of this solution was 1.5.

EXAMPLE XII

Two columns were set up to carry out extraction and re-extraction of uranyl nitrate. In the 1-inch diameter extraction column, which was packed with 5/32-inch internal diameter stainless steel helices, the aqueous feed solution contained 1 M thorium nitrate, 0.05 N nitric acid, 3 N ammonium nitrate and between $2 \times 10^{-4}$ and $3 \times 10^{-4}$ M uranyl nitrate. The extraction column was provided with a lower extractor portion and an upper scrubber portion. The aqueous feed solution was introduced into the extractor portion near the top thereof and hexone containing 0.02 N nitric acid was introduced near the bottom of the extractor portion. The flow rates of these solutions through the packed column were 20 and 30 ml./min., respectively. The aqueous raffinate was withdrawn from the bottom of the extractor portion. The hexone extract passed upward from the extractor portion through the scrubber portion where it was contacted counter-currently with an aqueous solution containing 6 N ammonium nitrate introduced near the upper part of the scrubber portion at a flow rate of 10 ml./min. The aqueous scrubber solution passed downward through the extractor portion becoming combined with the aqueous raffinate from the feed solution. The combined aqueous raffinate contained about 0.7 M thorium nitrate, about 0.04 N nitric acid, 4 N ammonium nitrate and less than $1 \times 10^{-7}$ M uranyl nitrate. The hexone extract withdrawn from the top of the scrubber portion of the column contained less than $1 \times 10^{-5}$ M thorium nitrate, about 0.01 N nitric acid and between $1.3 \times 10^{-4}$ and $2 \times 10^{-4}$ M uranyl nitrate. The hexone extract solution was introduced in the bottom portion of the second column at a flow rate of 30 ml./min. An aqueous solution containing between 0.01 and 0.1 N nitric acid was introduced in the upper portion of the stripping column at a flow rate of 0.75 ml./min. It flowed countercurrent to the hexone extract and removed uranyl nitrate to provide an aqueous extract solution which was withdrawn from the bottom of the column and which contained $5.8 \times 10^{-3}$ M uranyl nitrate and about 0.4 N nitric acid. The foregoing data show quantitative uranium extraction along with a high degree of thorium decontamination of uranium. The original ratio of thorium to uranium was greater than 3,000. The observed ratio of thorium to uranium in the uranium obtained from the aqueous extract solution from the second column was between 0.01 and 0.02. The decontamination with respect to thorium was estimated to be about $2 \times 10^5$. The decontamination of the uranium from gross radioactivity due to protactinium and fission product elements was between $1 \times 10^5$ and $3 \times 10^5$.

The data of some of the examples presented above clearly show that upon increasing the total nitrate concentration to 8 N, the thorium extraction is low and increases slowly, but upon increasing the total nitrate concentration beyond 8 N the thorium extraction increases exponentially.

The foregoing examples are merely illustrative of the present invention and well-known procedures and apparatus may be used in the process. While the examples used tracer concentrations of uranyl and protactinium nitrates, the process is also suitable when micro- and macro-concentrations of these compounds are present. Of course, the examples show that the process is eminently suited to the separation of uranium when the thorium to uranium ratio is 100 and higher. The extraction steps may be effected by the use of batch, continuous batch, batch countercurrent or continuous countercurrent methods. The organic solvent may be either the dispersed phase or the continuous phase.

This application is a continuation-in-part of our copending application, Serial No. 26,724, filed May 12, 1948, entitled "Solvent Extraction Process for Protactinium."

The foregoing illustrations and embodiments of this invention are not intended to limit its scope which is to be limited entirely by the appended claims.

What is claimed is:

1. A process for the separation of uranium from a mixture containing uranium and thorium, which comprises forming therefrom an aqueous solution containing uranyl and thorium nitrates, up to 3 N nitric acid, and a nitrate salting-out agent, said salting-out agent, thorium nitrate and nitric acid providing a maximum nitrate concentration of 8 N, contacting said aqueous solution with an aliphatic oxygen-containing organic solvent of the group consisting of alcohols, ketones, esters, and polyglycol ethers, and mixtures thereof, said solvent being substantially immiscible with said solution, and separating the resultant aqueous phase and organic solvent extract phase containing uranyl nitrate.

2. The process of claim 1 wherein the organic solvent is a polyglycol ether.

3. A process for the separation of uranium from a mixture containing uranium and thorium, which comprises forming therefrom an aqueous solution containing uranyl and thorium nitrates, up to about 1 N nitric acid, and a nitrate salting-out agent, said salting-out agent, thorium nitrate and nitric acid providing a maximum nitrate concentration of 6 N, contacting said aqueous solution with an aliphatic ketone which is substantially immiscible with said solution, and separating the resultant aqueous phase and ketone extract phase containing uranyl nitrate.

4. The process of claim 3 wherein the aliphatic ketone is methyl isobutyl ketone.

5. The process of claim 3 wherein the aliphatic ketone is methyl isobutyl ketone and the salting-out agent is aluminum nitrate.

6. The process of claim 3 wherein the aliphatic ketone is diisopropyl ketone.

7. A process for the separation of uranium from a mixture containing uranium and thorium, which comprises forming therefrom an aqueous solution containing uranyl and thorium nitrates, up to about 1 N nitric acid, and a nitrate salting-out agent, said salting-out agent, thorium nitrate and nitric acid providing a maximum nitrate concentration of 6 N, contacting said aqueous solution with n-amyl acetate, and separating the resultant aqueous phase and ester extract phase containing uranyl nitrate.

8. A process for the separation of uranium from a mixture containing uranium, thorium and protactinium, which comprises forming therefrom an acidic aqueous solution containing uranyl, thorium and protactinium nitrates, up to 0.1 N nitric acid, and a nitrate salting-out agent, said salting-out agent, thorium nitrate and nitric acid providing a maximum nitrate concentration of 8 N, contacting said aqueous solution with an aliphatic oxygen-containing organic solvent of the group consisting of alcohols, ketones, esters, and polyglycol ethers, and mixtures thereof, said solvent being substantially immiscible with said solution, and separating the resultant aqueous phase and organic solvent extract phase containing uranyl nitrate.

9. A process for the separation of uranium and protactinium from a mixture containing uranium, thorium and protactinium, which comprises forming therefrom an aqueous solution containing uranyl, thorium and protactinium nitrates, between 0.1 and 3 N nitric acid, and a nitrate salting-out agent, said salting-out agent, thorium nitrate and nitric acid providing a maximum nitrate concentration of 8 N, contacting said aqueous solution with an aliphatic oxygen-containing organic solvent of the group consisting of alcohols, ketones, esters, and polyglycol ethers, and mixtures thereof, said solvent being substantially immiscible with said solution, and separating the resultant aqueous phase and organic solvent extract phase containing uranyl nitrate and protactinium nitrate.

10. The process of claim 9 wherein the organic solvent is methyl isobutyl ketone.

11. The process of claim 9 wherein the organic solvent is dissopropyl ketone.

12. The process of claim 9 wherein the organic solvent is n-amyl acetate.

13. A process for the separation of uranium from a mixture containing uranium and thorium, which comprises forming therefrom an aqueous solution containing uranyl and thorium nitrates, up to 3 N nitric acid, and a nitrate salting-out agent, said salting-out agent, thorium nitrate and nitric acid providing a maximum nitrate concentration of 8 N, contacting said aqueous solution with an aliphatic oxygen-containing organic solvent of the group consisting of alcohols, ketones, esters, and polyglycol ethers, and mixtures thereof, said solvent being substantially immiscible with said solution, separating the resultant aqueous phase and organic solvent extract phase containing uranyl nitrate, contacting said organic solvent extract phase with water, and separating an organic solvent phase and an aqueous extract phase containing uranyl nitrate.

References Cited in the file of this patent

UNITED STATES PATENTS 2,227,833   Hixson et al. _____ Jan. 7, 1941

OTHER REFERENCES

Misciattelli: "Gazzetta Chimica Italiana," vol. 60, pp. 833, 842 (1930).

Templeton et al.: "Journal of Physical and Colloid Chemistry," vol. 51, pp. 1441–1449 (1947).